Patented Jan. 23, 1940

2,188,204

UNITED STATES PATENT OFFICE 2,188,204

BITUMINOUS MIXTURE

Henri Marc, Cincinnati, and Harold W. Greider, Wyoming, Ohio, assignors to The Philip Carey Manufacturing Company, a corporation of Ohio No Drawing. Application January 24, 1936, Serial No. 60,636

7 Claims. (Cl. 134—51)

This invention relates to mixtures of bituminous materials with volatile solvents ranging from liquids to plastics of troweling consistency and suitable for the many and various uses for paints and plastic compositions, and particularly suitable for a weather exposed surfacing covering or for mopping a surface preliminary to the laying of weather surfacing sheets thereon as in a roofing or similar structures. The bituminous composition material is adapted for a wide range of uses and particularly for uses where it is exposed to the weather and subjected to the deteriorating influence of atmospheric conditions. Asphalts, such as Mexican, Mid-Continent and cracked residues which have not been blown, have relatively low softening points and high penetrations, and while commonly used for weather surfacing and other like uses, they do not have a long life when exposed to weathering or atmospheric conditions. If they are blown to a sufficiently high softening point to give satisfactory weathering characteristics they become less completely soluble in petroleum solvents and the solutions have too high a viscosity and tend to thicken, even to gel or liver, while stored in a container. These solutions are very viscous and quickly congeal or gel and even when sealed within containers for subsequent use, there is always a certain amount of thickening taking place before actual use and this thickening may be so great as to cause gelation so that when they are stored for the time interval necessary between manufacture and their sale and use, they are neither in suitable condition for application nor satisfactory for use after being applied.

It is the aim of the present invention to either select special types of bituminous materials which are found to have superior qualities but which are not completely and readily incorporated in solution with a volatile petroleum solvent, although they have superior qualities as a waterproofing and weather-resistant material after they are mixed with a volatile petroleum solvent in solution, or else treat the above mentioned bituminous materials to give them characteristics possessed by these special types of bituminous materials. The special types of bituminous materials referred to are those which have superior weathering qualities but are not readily incorporated in solution and the treated asphalts which have characteristics and qualities, such as a relatively low temperature susceptibility factor, which make them more weather-proof and weather-resistant over long periods of time when subjected to atmospheric conditions. A given asphalt flux may be blown up to a relatively higher softening point than that which is ordinarily used in bituminous paints. These have not heretofore been used because of their strong tendency toward thickening and livering.

Within this selected special type of bituminous materials having certain desired characteristics or the bituminous materials treated to give same the certain desired qualities or characteristics, particularly a blown asphalt having a high softening point and good weathering qualities, an ingredient or ingredients may be advantageously incorporated to prevent thickening, thereby causing the bituminous base material to remain in solution for an indefinite length of time to permit it being stored for long periods of time before being shipped to the job, and yet be in suitable condition for application any time subsequent to its manufacture. Another means or ingredient may also advantageously be incorporated in the solution to prevent the bituminous base from livering while in solution in a petroleum solvent vehicle that is commonly used in paints, such as the V. M. and P. naphtha type of solvent.

In carrying out the invention Mexican or Mid-Continent asphalt or heat treated residues may be further treated as by air blowing or steam treating to raise the softening point a substantial amount and decrease the temperature susceptibility factor. The Mid-Continent asphalt is the preferred one of the group mentioned, and the invention may be described in connection therewith. In its original condition it does not usually have over 100° F. melting point and not under 25 penetration. These low softening point asphalts or residues do not have the length of life necessary to make them suitable for paints and other bituminous cementing or coating compositions which are to be subjected to atmospheric conditions. They may be treated to give them a longer life, thereby making them suitable for these uses. For example, Mid-Continent asphalt may be treated to raise its melting point to 150° F. or higher, preferably from 200° to 300° F., as it has been found that using asphalt in this high temperature softening range gives superior weather resisting properties for a long period of time. This raising of the softening point may be done by air blowing, steam refining or some other suitable method for oxidizing or polymerizing the material which results in decreasing the temperature susceptibility factor of the original asphalt, thus giving it improved weather resistance. The disadvantage of using high softening point asphalt is that it has a strong tendency to thicken and liver or gelatinize after being dissolved in the volatile petroleum solvent. When first compounded the mixture may appear liquid but will soon thereafter thicken or be transformed into a jelly-like mass even though it is carefully packed in sealed containers for handling and transporting to its place of use. Accordingly such material would be serviceable at best only for use and application immediately after its manufacture, but would not be suitable where it needed to be packed and stored for subsequent use.

It has been found that the composition may be kept in solution for an indefinite time and yet be suitable for application and use by incorporating within the solution some ingredient to prevent excessive thickening and/or gelation of the asphaltic base. A suitable component or ingredient to prevent gelation is typified by any suitable resin such as, for example, is obtained by chemical treatment of certain compounds found in coal tar distillates, such as, cumene, indene, or other similar condensation products. This resin ingredient, commonly called Cumar, is preferably added while the asphalt is in a molten condition, but, of course, may be added at any time in as much as prevention of gelatination is a result of the ingredient therein rather than as to the time when same may be incorporated. Petroleum naphtha is suitable as the solvent or vehicle in which the bituminous base is incorporated, but is representative of any other suitable petroleum solvent. A suitable solvent would have a boiling range between 100° and 500° F. The naphtha may be added at any time either before or after the addition of the resin. These resins, typified by products derived from cumene, indene and the like do not reduce the viscosity of the composition to any great extent, and if there be any reduction in the viscosity of the composition by this ingredient, it is inconsequential. Its main purpose is to prevent gelation of the composition. While many and various resins are suitable for this purpose, the cumar type is preferable. As previously stated, even though the resin ingredient did prevent gelation, it would not decrease the viscosity of the composition and this is desirable in order to make the composition suitable for application and to permit preparing a solution containing a sufficiently high proportion of the asphalt.

Accordingly a suitable ingredient may be incorporated in the solution to decrease the viscosity thereof and to retain it at this decreased viscosity. A distillate of wood, which is a fraction from the gum rosin of wood, may be useful for this purpose. It is commonly known as dipentene and has not heretofore, so far as known, been used in bituminous compositions. Chemically it is inactive limonene but the commercial product contains small amounts of pinene, terpinolene, terpinene and cymene. The commercial product contains a combined total of about 5 to 15% of these specified compounds. Dipentene is the preferred ingredient for the purpose of decreasing the viscosity and holding the viscosity to a predetermined degree but there are other materials which are also suitable as equivalents, such as, for example, wood rosin, ester gum, pine tar, triacetin, triphenyl-phosphate, tricresyl-phosphate, diethylphthalate, diamylthalate, tetrahydronaphthalene, decahydronaphthalene, tetrahydroanthracene, octahydroanthracene, decahydroanthracene, perhydroanthracene, "Solvesso" (hydrogenated naphthas produced from petroleum distillates by Standard Oil Company), "Nevinol" (a polymer obtained from coal-tar distillates by Neville Company, Pittsburgh, Pa.), and "Dytine" (similar to dipentene, but a wider boiling range material). Any one of these last specified ingredients as well as dipentene, of which they are the equivalent, could be used alone or in combination with each other. Some of them are liquids and some are solids. With any one of these ingredients or a combination thereof the viscosity of the bituminous composition may be reduced to a predetermined degree and retained at this predetermined value over an indefinite period of time with only a slight or moderate increase in viscosity. A suitable proportion may be from a fraction of a per-cent to about 15%. This gives more than a mere diluting effect in reducing the viscosity. For example, about 2% of dipentene in a petroleum naphtha solution containing about 50% asphalt of 225° F. softening point has been found to decrease its viscosity by about 48.6%, whereas from the diluting effect a viscosity reduction of only perhaps 4 to 6% would be expected.

Another ingredient, if desired, may advantageously be added to the composition for the purpose of holding the viscosity of the bituminous composition to substantially this predetermined value. This is typified by a product known as "Hercolyn" which is derived from alcoholic esters of abietic acid by means of a chemical treatment which makes it more resistant to oxidation. It is hydrogenated methyl abietate from abietic acid. Another suitable substance which may be used together with, or in lieu of Hercolyn is "Abalyn" which is derived from a similar methyl ester by chemical treatment. These are representative of any suitable ingredient for accomplishing this purpose. Either of these two ingredients or a combination thereof aid in holding the viscosity of the bituminous composition to the value to which it has been reduced by the other ingredients. The above Hercolyn and Abalyn ingredients may be combined in any suitable proportions. One formula is typified by a composition comprising about 35 to 75% of Mid-Continent asphalt having a softening point of from 200° to 300° F.; about 1 to 10% of dipentene; and about 1 to 10% of resin such as cumar. The balance of the composition is the petroleum solvent vehicle.

If "Hercolyn" or "Abalyn" be included, the proportion of the dipentene may be correspondingly reduced by the amount of the "Hercolyn" added which is about 1 to 5%. With these proportions of the ingredients above specified, the composition may be combined with any proportion of petroleum solvent to have the composition ranging from a relatively thin consistency, such as paint to a relatively thick consistency such as plastic, the proportion of the petroleum solvent depending mainly upon the desired consistency of the solution and on the character of the asphalt used. In commercial bituminous paints the proportion of solvent, by weight, ordinarily ranges from twenty to eighty-five per cent and in commercial plastics the proportion of solvent is a relatively small amount, from about ten to forty per cent. The product which is the subject of this application can contain about the same relative proportion of solvent.

Filling materials of various kinds may be added. These are typified by such materials as mica, fine asbestos, fibrous talc, slate flour and the like, which are rather finely divided or the filling material may be of longer fibers or a combination of long and fine fibers. The filling material stabilizes the composition material and reduces the tendency for any large size crevices or cracks to develop in the paint or plastic layer. If any cracks or crevices do start to develop, they are broken up into ones which are relatively small and inconsequential in size, thereby preserving the effective life of the paint or plastic material on the surface covered thereby.

Because of the high softening point of the bituminous component the composition dries very quickly, thereby permitting subsequent coats to be quickly applied without waiting long periods of time for the first coat to dry. With paints and plastic cement compositions heretofore employed a week or more is required in some cases in which to have the first applied coat sufficiently dry to receive a second coat or to finish the application for use. Others required a less time but all required a substantially longer period in which to dry than that required by the material herein described. The quick-drying material herein described facilitates and speeds the application of the material and the completion of the work under construction.

While the invention has been described in detail as to the composition of the material and the compounding thereof, it will be understood that there may be various changes as to components and their proportions without departing from the spirit of the invention.

We claim:

1. A bituminous composition comprising about thirty-five (35) to seventy-five (75) percent bituminous base composed predominantly of asphalt having a softening point from about 150 to 300° F. and a low temperature susceptibility factor, a petroleum solvent, and from a fraction of one (1) to fifteen (15) percent of dipentene for decreasing the viscosity of and retaining the composition substantially at the decreased viscosity, and about one (1) to ten (10) percent resin derived from cumene and indene to prevent gelation of the base, thereby providing a solution in which the bituminous base does not liver or become gelatinized.

2. A bituminous composition comprising about thirty-five (35) to seventy-five (75) percent bituminous base composed predominantly of asphalt having a softening point from about 150 to 300° F. and a low temperature susceptibility factor, a petroleum solvent, and from a fraction of one (1) to fifteen (15) percent of dipentene for reducing the viscosity of the composition to a predetermined range, and from one (1) to five (5) percent of an ester of the group consisting of "Hercolyn" and "Abalyn" for retaining the composition within the predetermined viscosity range.

3. A bituminous composition comprising about thirty-five (35) to seventy-five (75) percent bituminous base composed predominantly of asphalt having a softening point from about 150 to 300° F. and a low temperature susceptibility factor, a petroleum solvent, means adapted to reduce the viscosity of the composition to a predetermined range of the group consisting of dipentene, wood rosin, ester gum, pine tar, triacetin, triphenyl phosphate, tricresyl phosphate, diethyl phthalate, diamyl phthalate, tretrahydronaphthalene, decahydronaphthalene, tetrahydroanthracene, octahydroanthracene, decahydroanthracene, perhydroanthracene, "Solvesso", "Nevinol" and "Dytine", and a resin derived from cumene and indene for preventing gelation of the bituminous base.

4. A bituminous composition comprising about thirty-five (35) to seventy-five (75) percent asphalt having a softening point from about 150 to 300° F., a petroleum solvent, and from a fraction of one (1) to about fifteen (15) percent dipentene to reduce the viscosity of the composition to a predetermined range, and about one (1) to ten (10) percent resin derived from cumene and indene, and about one (1) to five (5) percent of "Hercolyn", said composition being non-livering and of stable viscosity.

5. A bituminous composition comprising about thirty-five (35) to seventy-five (75) percent bituminous base composed predominantly of asphalt having a softening point from about 150 to 300° F. and a low temperature susceptibility factor, a petroleum solvent, from a fraction of one (1) to fifteen (15) percent of dipentene adapted to reduce the viscosity of the composition to a predetermined range, about one (1) to ten (10) percent of resin derived from cumene and indene adapted to prevent gelation of the base and provide a stable non-livering composition, and finely divided filling material.

6. A method of making a bituminous composition comprising dissolving in a petroleum solvent about thirty-five (35) to seventy-five (75) percent of a bituminous base composed predominantly of asphalt having a softening point of 150 to 300° F., incorporating in the composition about one (1) to ten (10) percent of a resin derived from cumene and indene to prevent gelation of the same, and adding about a fraction of one (1) to fifteen (15) percent of dipentene for decreasing the viscosity of the composition to a desired degree.

7. A method of making a bituminous composition comprising dissolving in a petroleum solvent a bituminous base composed predominantly of asphalt having a softening point of 150 to 300° F., incorporating in the composition about one (1) to ten (10) percent of a resin derived from cumene and indene to prevent gelation of the same, decreasing the viscosity of the composition to a desired degree by adding a fraction of one (1) to fifteen (15) percent of dipentene and including from about one (1) to five (5) percent of an ester of the group consisting of "Hercolyn" and "Abalyn" for maintaining the viscosity substantially constant.

HENRI MARC.
HAROLD W. GREIDER.